United States Patent
Shibutani et al.

(10) Patent No.: US 6,918,702 B2
(45) Date of Patent: Jul. 19, 2005

(54) OPTICAL CONNECTOR SYSTEM

(75) Inventors: Michitomo Shibutani, Tokyo (JP); Isamu Inokoshi, Tokyo (JP); Katsuya Ezawa, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 24 days.

(21) Appl. No.: 10/269,016

(22) Filed: Oct. 11, 2002

(65) Prior Publication Data

US 2003/0072536 A1 Apr. 17, 2003

(30) Foreign Application Priority Data

Oct. 17, 2001 (JP) ........................................ 2001-319151

(51) Int. Cl.$^7$ ................................................ G02B 6/36
(52) U.S. Cl. ........................................................ 385/76
(58) Field of Search ............................ 385/53, 55, 76, 385/77

(56) References Cited

U.S. PATENT DOCUMENTS

| 5,293,581 A | * | 3/1994 | DiMarco ...................... 385/76 |
| 5,418,875 A | | 5/1995 | Nakano |
| 5,692,080 A | * | 11/1997 | Lu .............................. 385/60 |
| 6,193,420 B1 | | 2/2001 | Sikorski |
| 6,568,861 B2 | * | 5/2003 | Benner et al. ................ 385/55 |
| 6,712,523 B2 | * | 3/2004 | Zimmel ....................... 385/72 |

FOREIGN PATENT DOCUMENTS

| EP | 0689069 | 12/1995 |
| WO | WO 98 52080 | 11/1998 |
| WO | WO 00 46623 | 8/2000 |

* cited by examiner

*Primary Examiner*—Chau N. Nguyen
(74) *Attorney, Agent, or Firm*—Takeuchi and Takeuchi (57) ABSTRACT

An optical connector system comprises at least one shield case (14) provided through a panel (12) at a through-hole of the panel, and at least one pair of housings (13 and 13') provided in the shield case, each housing receiving at least one plug (17) and having at least one sleeve (15) for aligning and holding top end of the plug. The shield case comprises at least one insertion hole (25) in which the plug is inserted, a partition plate (24) made of a conductive material and provided between the pair of housings, and a flange portion (27) made of a conductive material and grounded to the ground of the panel. The partition plate and flange portion are provided such that leakage and entrance of electromagnetic waves from the through-hole of the panel are minimized.

7 Claims, 11 Drawing Sheets

PRIOR ART

OPTICAL CONNECTOR SYSTEM

BACKGROUND OF THE INVENTION

1. Field of the Invention

The present invention relates to an optical connector system to connect optical cables and, especially, to a shield structure for an optical connector provided through a panel.

2. Description of the Related Art

As optical communication system using optical cables has rapidly spread, the leakage of electromagnetic waves from communication equipment constituting the optical communication system has become a problem. An optical connector for connecting optical cables or an optical connector and other optical equipment is required to prevent the leakage of electromagnetic waves.

Figure 11:
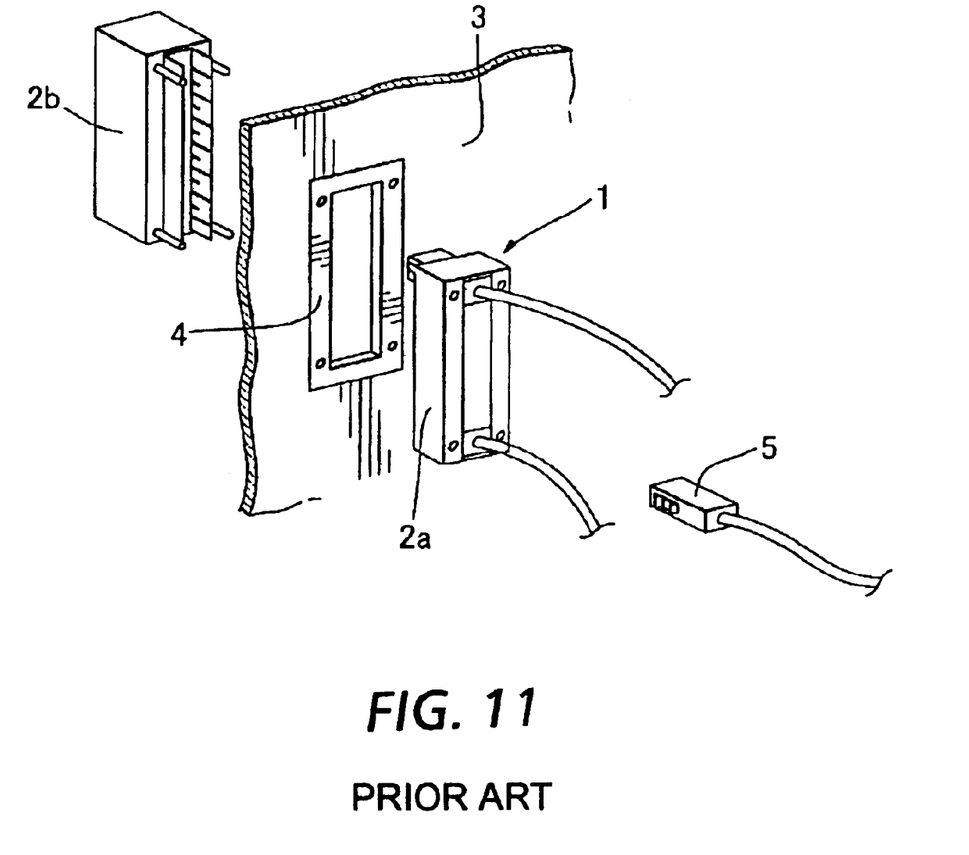
FIG. 11 is an exploded perspective view of an optical connector according to the prior art.

An optical connector generally comprises a plug connected to an end of an optical cable and an adapter into or from which the plug is plugged or unplugged. Japanese Patent Application Kokai No. 10-39170 discloses an optical connector which prevents the leakage of electromagnetic waves. As shown in FIG. 11, such a conventional optical connector comprises an adapter 1 having conductive housings 2a and 2b which are connected to a ground face 4 of a panel 3 through ground spring (not shown). When a conductive plug 5 is plugged into the housings 2a and 2b, and the adapter 1 is connected with the ground face 4, the ground face 4 and housings 2a and 2b are electrically connected to prevent the leakage and entrance of electromagnetic waves.

However, when such an optical connector as disclosed in JP 10-39170 has a plurality of plugging sections to receive a plurality of plugs, there is a gap produced between the plugs provided in the adapter so that electromagnetic waves leak through the gap into the outside of the adapter, thus producing adverse effects on other electronic equipment, or electromagnetic waves enters the inside of the adapter through the gap, thus causing a communication failure.

Also, since the plug is required to have a shielding property, the cost of the plug is incresed.

SUMMARY OF THE INVENTION

Accordingly, it is an object of the invention to provide an optical connector system which minimizes the leakage of electromagnetic waves and reduces the manufacturing cost.

According to an aspect of the invention, an optical connector system comprises at least one shield case provided through a panel at a through-hole of the panel, and at least one pair of housings provided in the shield case and receiving a plurality of plugs, each housing having at least one sleeve for aligning and holding an end of the plug. The shield case comprises holes in which the plugs are inserted, a partition plate made of a conductive material and provided between the pair of housings, and a flange portion made of a conductive material and grounded to the panel. The partition plate and flange portion are provided such that leakage and entrance of electromagnetic waves from the through-hole of the panel are minimized.

The flange portion is preferably provided along the through-hole of the panel so as to cover a gap produced along a periphery of the through-hole.

When the shield case is inclined with respect to the panel, the flange portion is provided at a predetermined angle with respect to the partition plate, and connecting portions between the flange portion and the partition plate are made of a conductive material so that the leakage and entrance of electromagnetic waves through the through-hole of the panel are minimized.

A plurality of the housings are connected to each other in a stepped-shape and connecting portions for connecting the partition plates are made of a conductive material.

The shield case is fixed to the panel through the flange portion, and each of the pair of housings has an identical shape.

Either the pair of housings or the shield case comprises at least one engaging boss and the other has at least one engaging hole so that the pair of housings is held in the shield case by an engagement between the engaging boss and hole.

Each of the pair of housings has at least one engaging member, each having at least one engaging boss, and at least one engaging hole for engaging with the engaging boss, and the partition plate has at least one slit so that when the engaging member is inserted through the slit, the pair of housings are held in the shield case by an engagement between the engaging boss of one of the pair of housings and the engaging hole of the other of the pair of housings.

With the above structure, the partition plate, the flange portion, and the connecting portions minimize the opening area of through-hole portion of the panel, and, therefore, the leakage and entrance of electromagnetic waves are firmly reduced.

DESCRIPTION OF THE PREFERRED EMBODIMENTS

Embodiments of the invention will now be described with respect to the accompanying drawings.

In FIGS. 1–5, an adapter 11 according to the first embodiment of the invention is provided through a panel 12. The adapter 11 comprises a pair of housings 13 and 13' made of a plastic and having an identical shape, a shield case 14 made of a metal and accommodating the housings 13 and 13', and a predetermined number (two in the drawings) of split sleeves 15 provided between the housings 13 and 13'.

Figure 1:
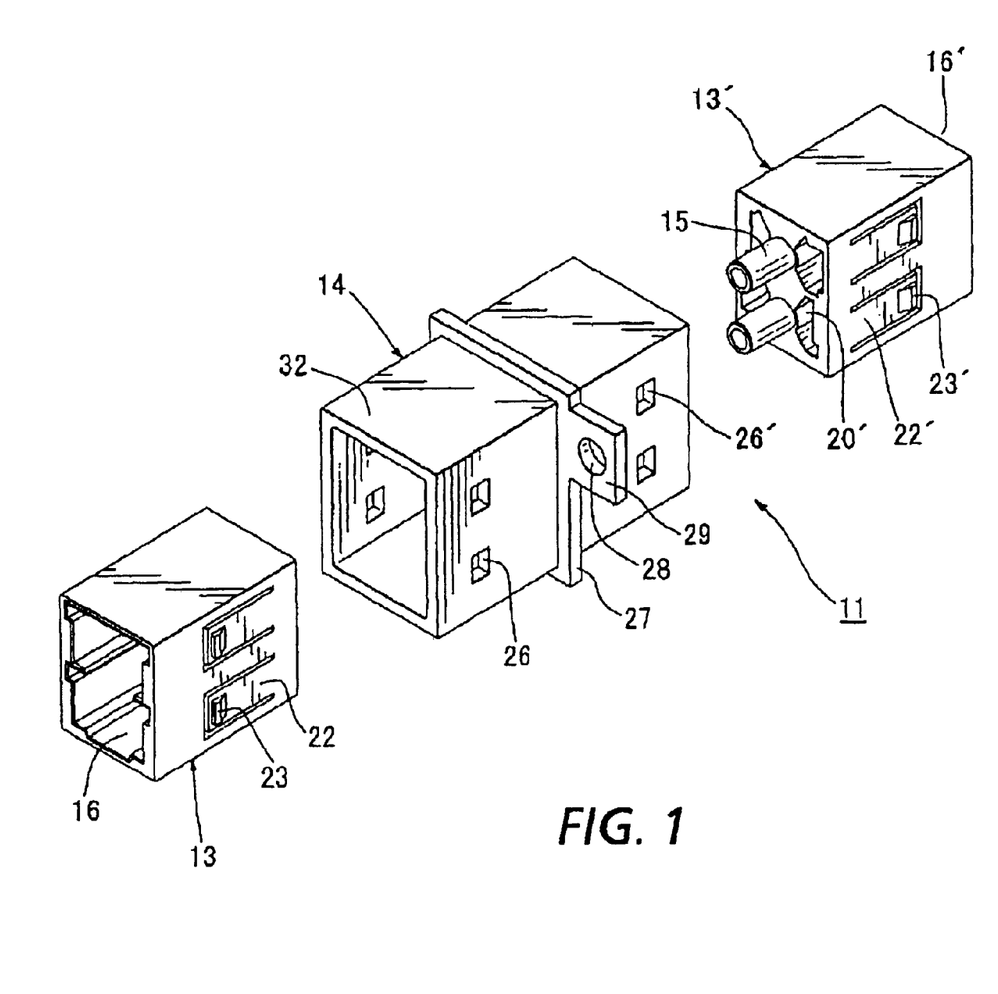
FIG. 1 is an exploded perspective view of an adapter according to the first embodiment of the present invention.
Figure 2:
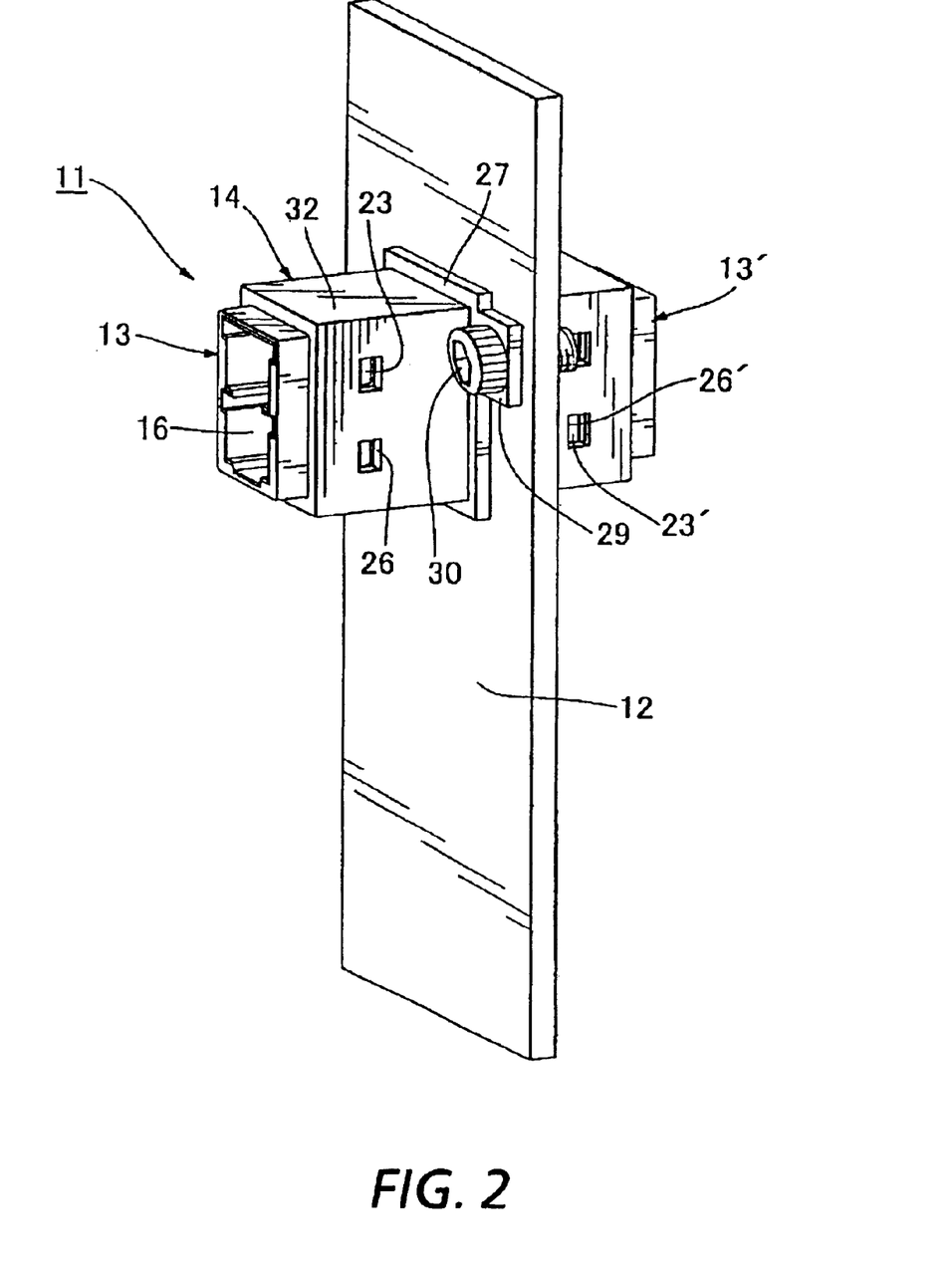
FIG. 2 is a perspective view of the adapter fixed to a panel.
Figure 3:
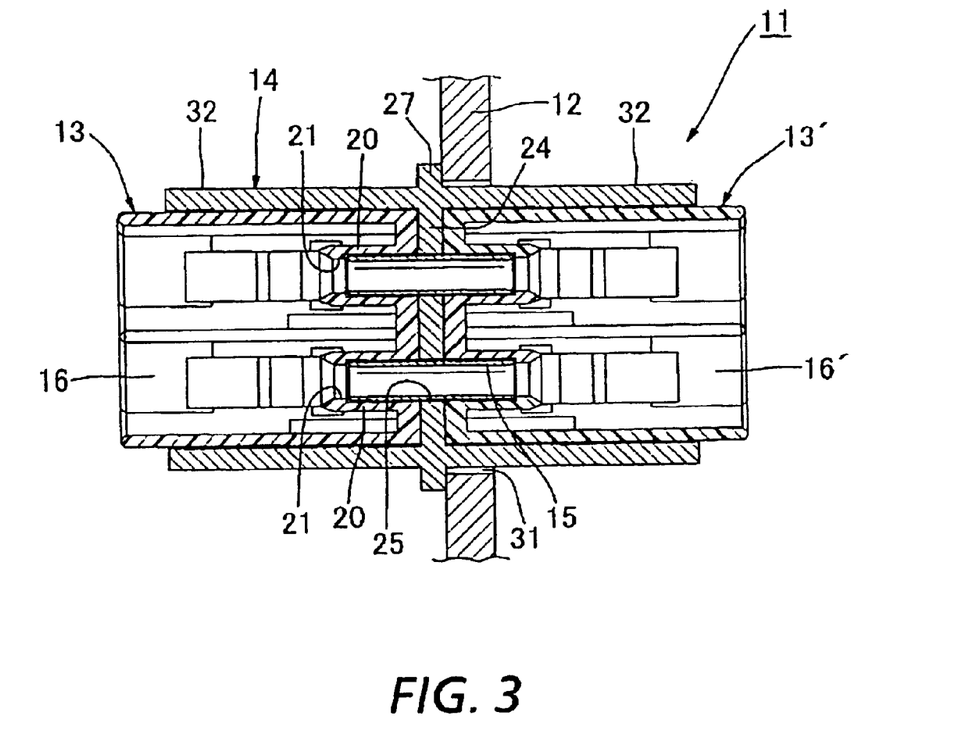
FIG. 3 is a sectional view of the adapter cut in a vertical plane.
Figure 4:
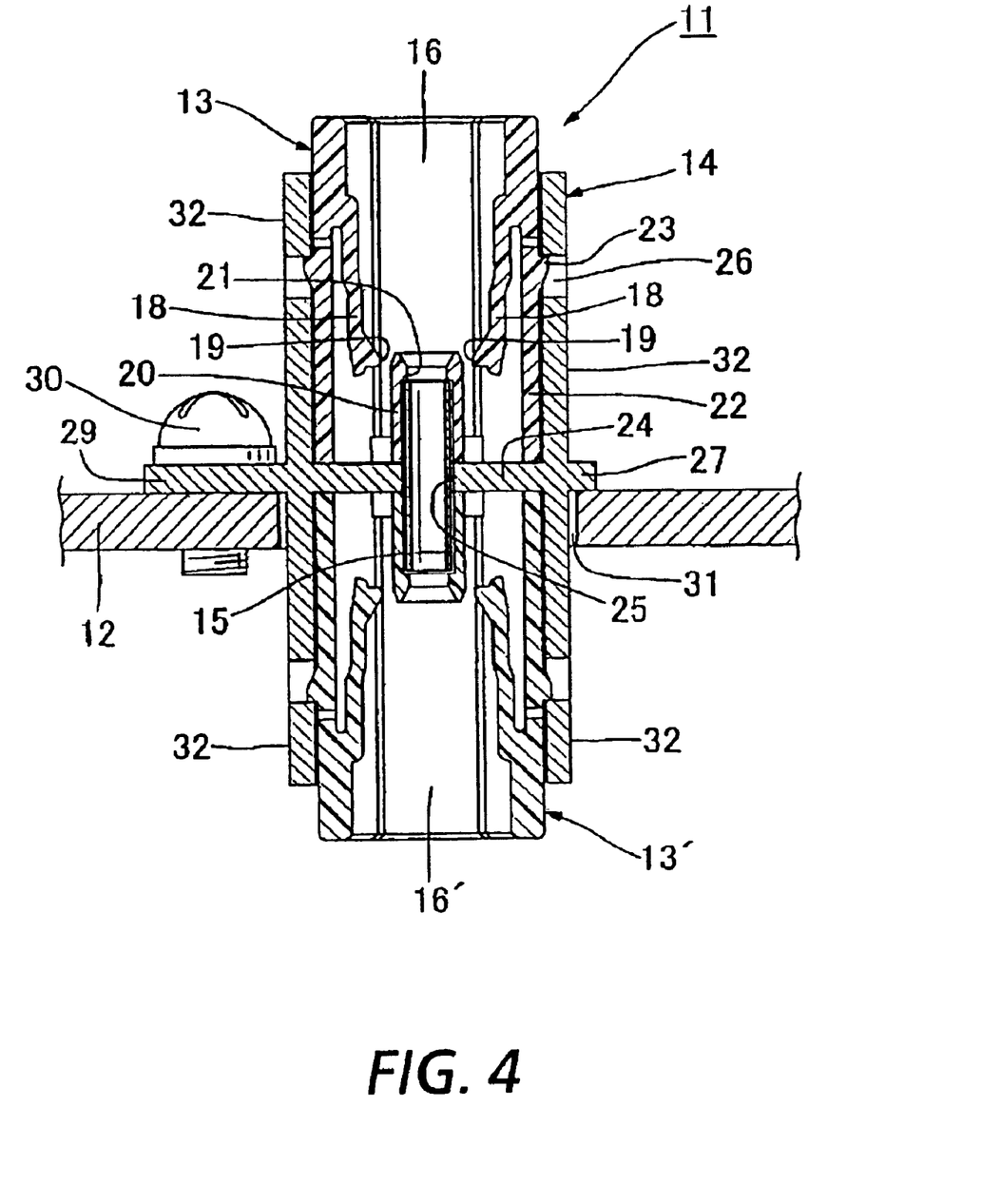
FIG. 4 is a sectional view of the adapter cut in a horizontal plane.
Figure 8:
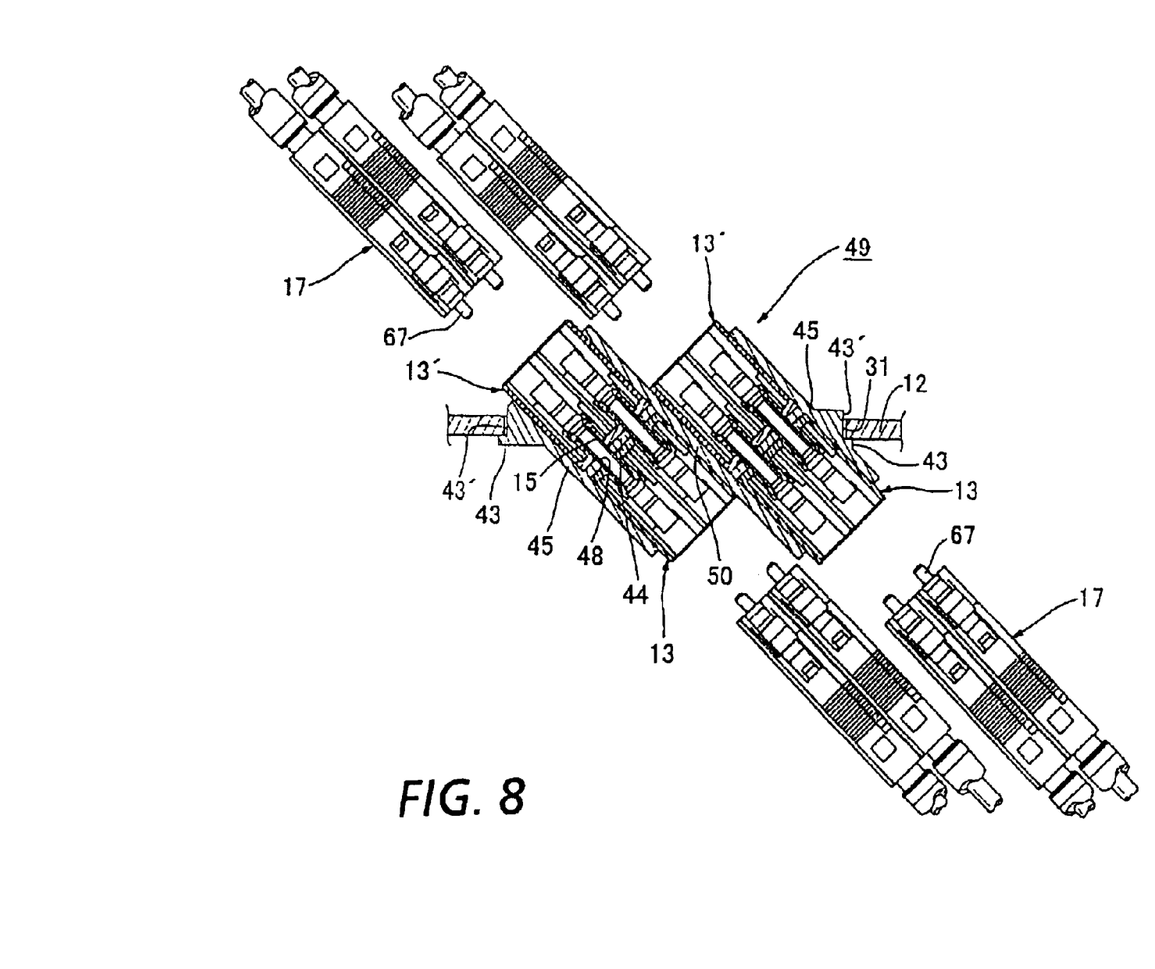
FIG. 8 is a sectional view of the adapter fixed to the panel according to the second embodiment.

Only one housing 13 will be described for simplifying the description. The housing 13 has plugging cavities 16 in two tiers, into which a two-core plug 17 is plugged (FIG. 8). A pair of plug locking members 18 are provided on each pair of opposite inside surfaces of side walls of the housing 13. Each plug locking member 18 is cantilevered at one end thereof and extends in a plugging direction of the plug 17. The plug locking member 18 comprises an engaging boss 19 projecting inwardly at a free end thereof. Cylindrical split sleeve supports 20 are provided inside the housing 13 in two tiers in parallel to each other for holding the split sleeves 15. The split sleeve supports 20 protrude inwardly at an end thereof to form a falling-off preventing portion 21. A predetermined number (four in the drawings) of cantilevered engaging members 22 are provided on outside surfaces of the housing 13 and extend in an unplugging direction of the plug 17. The engaging member 22 has a wedge-shaped boss 23 projecting outwardly at a free end portion thereof. The housings 13 and 13' have an identical shape, and, therefore, the number of required parts is minimized, thus reducing the manufacturing cost.

The shield case 14 has a shape of rectangular parallelepiped and comprises a partition plate 24 in the center of the inside thereof, which is made of a metal and extends in a direction perpendicular to the plugging direction of the plug 17. The partition plate 24 is provided between the housings 13 and 13', and has insertion holes 25 at positions corresponding to the split sleeve supports 20 so that the split sleeves 15 pass through the insertion holes 25. Consequently, the split sleeves 15 are plugged between the falling-off preventing portions 21 of the split sleeve support 20. As a result, when the plug 17 is plugged into the plugging cavity 16, a ferule 67 (FIG. 8) provided at a top of the plug 17 is aligned and held by the sprit sleeve 15.

Engaging holes 26 are provided in the shield case 14 at positions corresponding to the wedge-shaped bosses 23 so that the housing 13 is fixed to the shield case 14 by the engagement between the bosses 23 and the engaging holes 26. A flange portion 27 is provided in the center of the outside of the shield case 14 to provide an installation section which is fixed to the panel 12. The flange portion 27 lies in the same plane as the partition plate 24 and continuously extends from the partition plate 24. A fixing portion 29 is provided at a predetermined position on the flange portion 27 and has a fixing hole 28. The shield case 14 is fixed to the panel 12 by screwing a bolt 30 through the fixing hole 28 for electrical conduction to a ground face of the panel 12 through the installation section (the flange portion 27). A gap 31 is provided around through-hole portions of the panel 12. However, the gap 31 is covered and completely closed by the flange portion 27 so as to prevent the leakage or entrance of electromagnetic waves through the gap 31. Also, since only the insertion holes 25 for the split sleeves 15 are provided in the partition plate 24, the opening area in the partition plate 24 is minimized and the amount of the leakage and entrance of electromagnetic waves through the partition plate 14 is reduced.

According to the first embodiment, the installation section is provided in the form of a flange along the through-hole portion of the panel 12 and covers the gap 31 around the through-hole portion of the panel 12. However, it is not necessary that the installation section covers the entire area of the through-hole portion of the panel 12. Also, the method of fixing the shield case 14 to the panel 12 is not limited to screwing the bolt 30.

The shield case 14 may be made of other conductive materials, such as a die casting and a metal plating. If at least the partition plate 24 and the flange portion 27 are made of a conductive material, other portions of the shield case 14, such as portion 32 for covering the peripheral surface of the housing 13, may be made of a non-conductive material. In addition, the installation section may not lie in the same plane as the partition plate 24 as long as it continuously extends from the partition plate 24.

Figure 5:
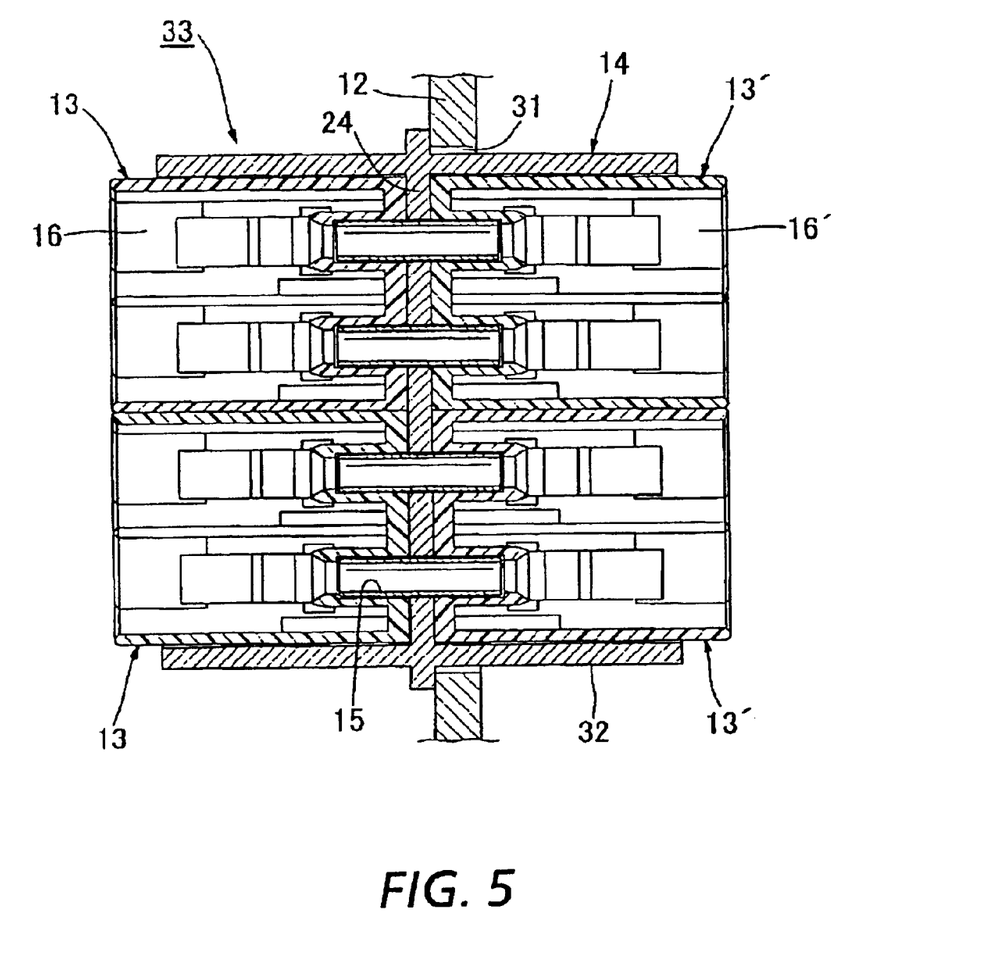
FIG. 5 is a sectional view of a modification to the first embodiment.

As shown in FIG. 5, the first embodiment is modified so as to be applicable to an adapter 33 of a tandem type having housings 13 and 13' connected to each other in the stepped-shape or a multiple type having three or more housings connected to each other in the stepped-shape.

Figure 6:
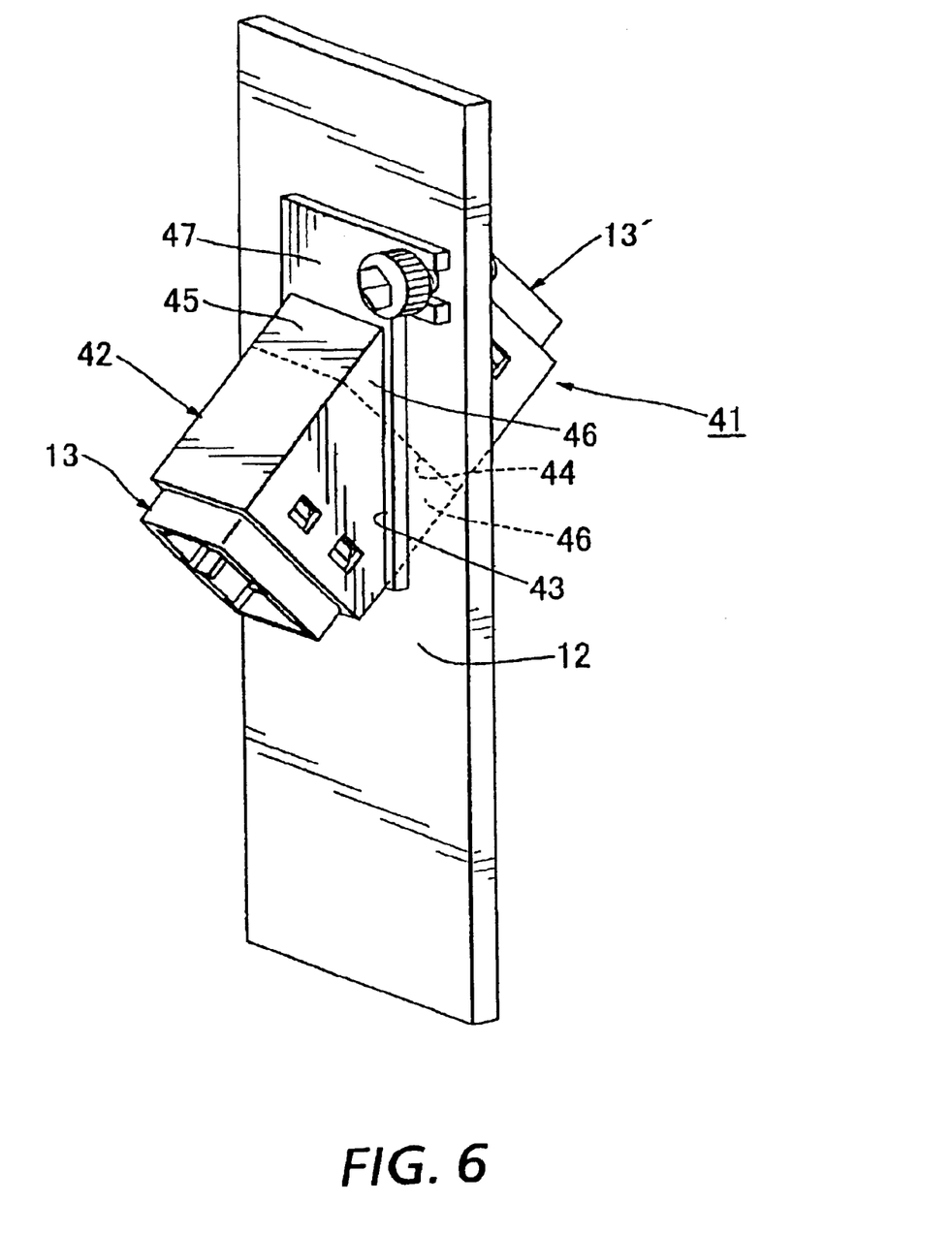
FIG. 6 is a perspective view of an adapter fixed to the panel according to the second embodiment of the present invention.
Figure 7:
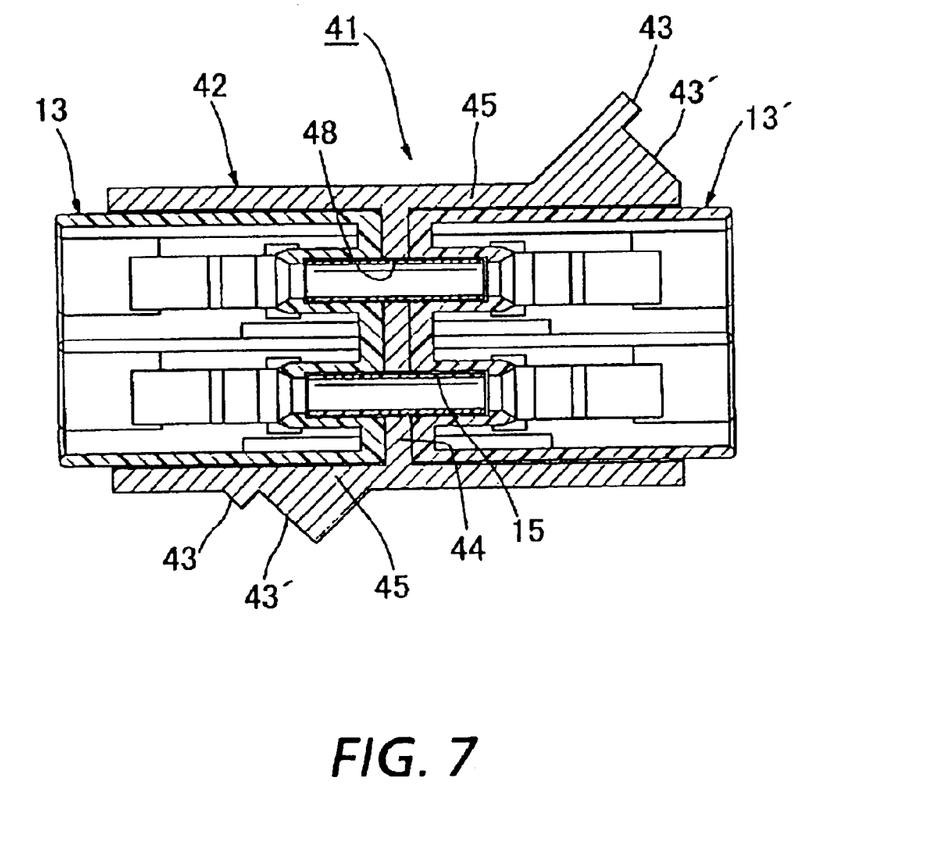
FIG. 7 is a sectional view of the adapter according to the second embodiment.

In the second embodiment shown in FIGS. 6–8, the same reference numbers will be used as those of the first embodiment for identical elements and detailed description thereof will be omitted.

A adapter 41 is provided through the panel 12 at an angle with respect to the vertical direction. A flange portion 43 and a stepped portion 43' of a shield case 42 are inclined at a predetermined angle, for example 45 degrees with respect to a partition plate 44. At least the flange portion 43, the partition plate 44, upper and lower connecting portions 45 provided between the flange portion 43 and the partition plate 44, and side connecting portions 46 are made of a conductive material, such as a metal, so that the leakage and entrance of electromagnetic waves from the through-hole portion of the panel 12 is reduced by the flange portion 43, the partition plate 44, and the upper and lower and side connecting portions 45 and 46. When the shield case 42 is fixed to the panel 12, the flange portion 43, the partition plate 44, and upper and lower and side connecting portions 45 and 46 are electrically connected to the ground face of the panel 12 through a fixing portion 47. The gap 31 around the through-hole portion of the panel 12 is covered by the flange portion 43. The partition plate 44 has only insertion holes 48 for the split sleeves 15 to minimize the opening area so that the amount of the leakage and entrance through the through-hole portion of he panel 12 is reduced.

As shown in FIG. 8, the second embodiment is modified so as to be applicable to an adapter 49 of a tandem type having housings 13 connected to each other in the stepped-shape or a multiple type having three or more housings connected to each other in the stepped shape. In the tandem type adapter 49 in FIG. 8, not only the flange portion 43, the partition plate 44, and the upper and lower connecting portions 45 and the side connecting portions 46 but also an intermediate connecting portion 50 which is provided between the housings 13 to connect a plurality of the partition plates 44, is made of a conductive material so that the leakage and entrance of electromagnetic waves from the through-hole portion of the panel 12 are reduced.

Figure 9:
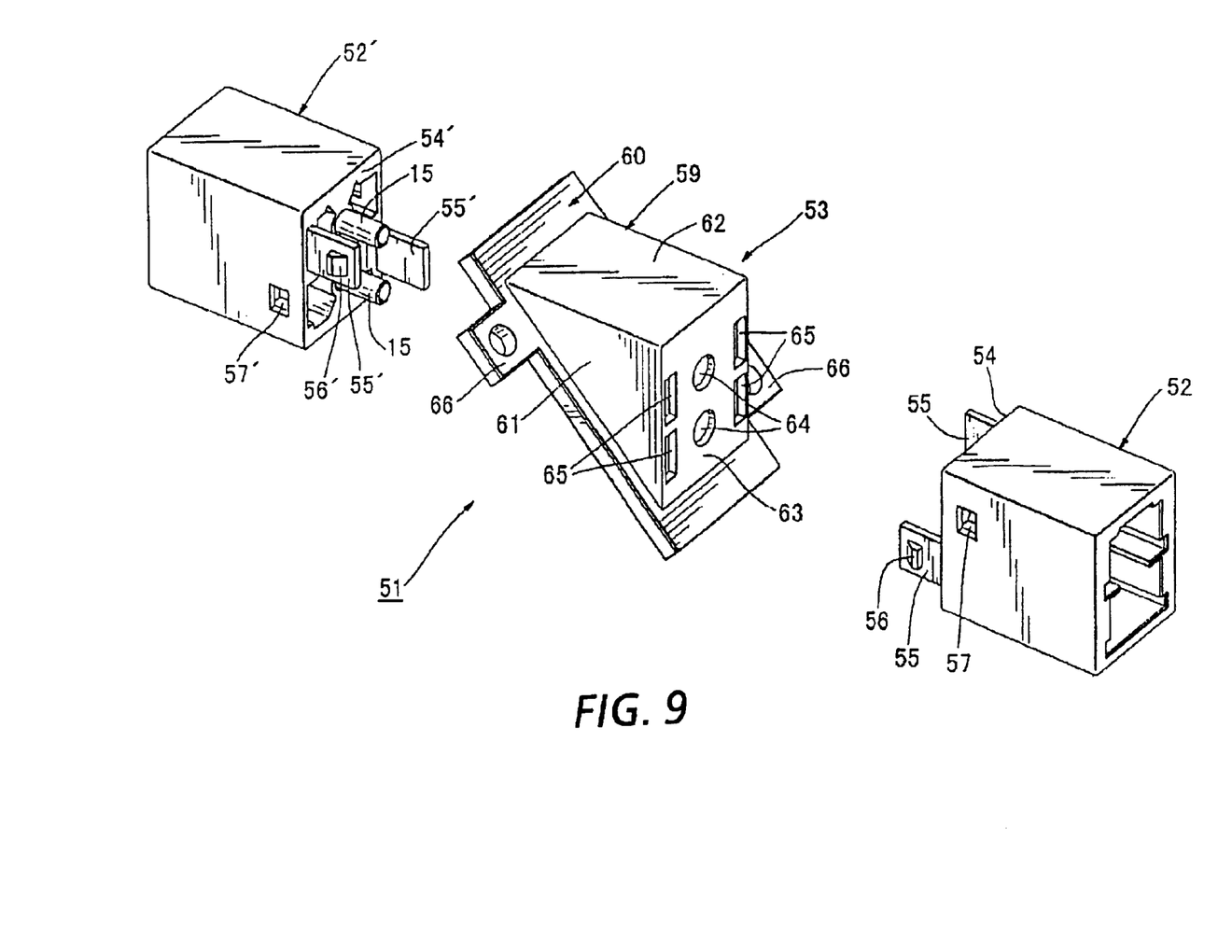
FIG. 9 is an exploded perspective view of an adapter according to the third embodiment of the present invention.
Figure 10:
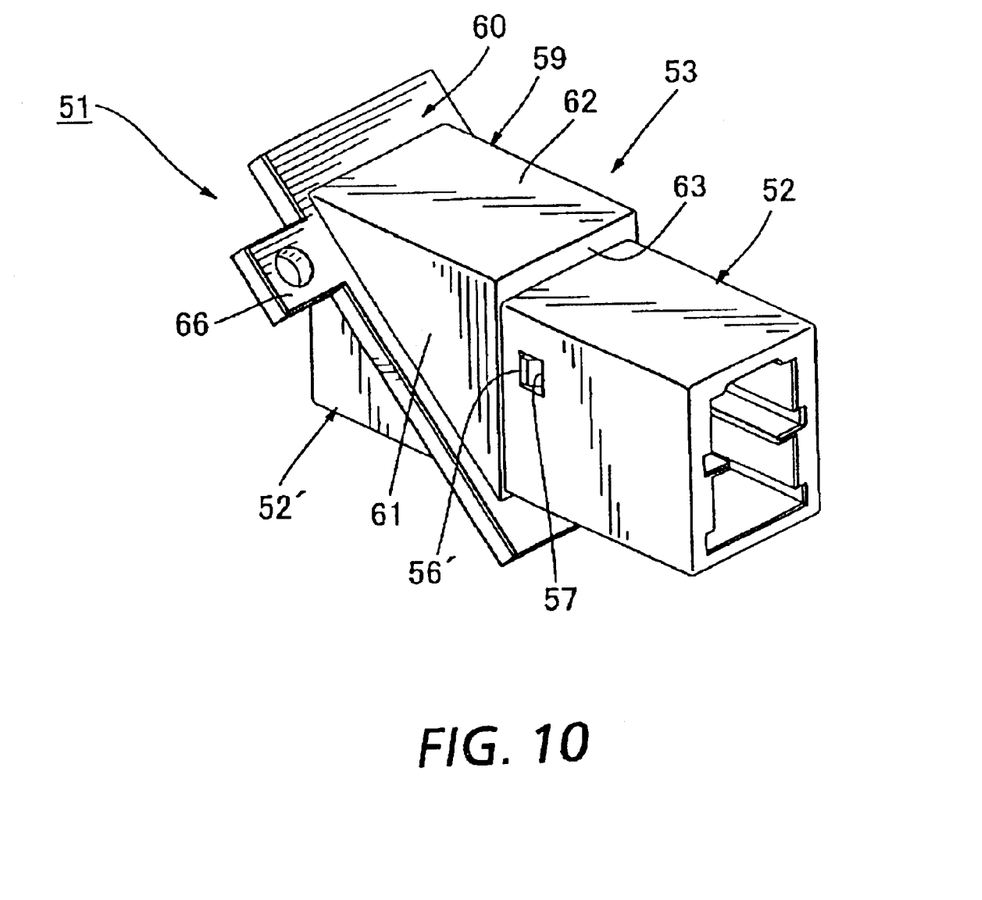
FIG. 10 is a perspective view of the adapter according to the third embodiment.

In the third embodiment shown in FIGS. 9–10, the same reference numbers will be used as those of the first embodiment for identical elements, and the detailed description thereof will be omitted.

An adapter 51 provided through the panel at an angle with respect to the vertical direction comprises a pair of housings 52 and 52' made of a plastic, a shield case 53 made of a metal and holding the housings 52 and 52', and split sleeves 15. The housings 52 and 52' have a predetermined number (two for each housing in the drawings) of cantilevered engaging members 55 and 55', respectively, on opposed end faces 54 and 54' thereof. The engaging members 55 or 55' each comprise a wedge-shaped boss 56 or 56' projecting outwardly at free ends thereof. Engaging holes 57 and 57' are provided in side walls of the housings 52 and 52', respectively, so as to engage with the bosses 56' and 56 of the mating housings 52' and 52.

The shield case 53 is made of a metal and comprises a housing accommodating section 59 in the form of a wedge-shaped box for accommodating the housing 52' and a flange portion 60 provided at an end portion of the housing accommodating section 59. The housing accommodating section 59 has triangular side faces 61 corresponding to side faces of the housing 52', a rectangular upper face 62 corresponding to an upper face of the housing 52', and an end face 63 corresponding to the end face 54' of the housing 52'. Two circular holes 64 are provided in the end face 63 for receiving the split sleeves 15. Slots 65 are provided in the end face 63, through which the engaging members 55 and 55' pass so that the bosses 56 and 56' of the engaging members 55 and 55' engage with the mating engaging holes 57' and 57 to hold the housing 52 in the shield case 53. A predetermined number (two in the drawings) of fixing portions 66 are provided on sides of the flange portion 60, though which the shield case 53 is fixed to the panel at an angle with the vertical direction.

The shield case 53 may be made of other conductive materials, such as a die casting and a metal plating. The third embodiment is modified so as to be applicable to a multiple type adapter having housings 52 and 52' connected to each other in the stepped-shape.

In the first, second, and third embodiments, the adapters 11, 33, 41, 49, and 51 are fixed to the panel 12 through the flange portions 27, 43, and 60 of the shield cases 14, 42, and 53, respectively. However, a separate fixing member may be employed instead of the shield cases 14, 42, and 53.

The plugging cavities 16 and 16' are so designed that the two-core plug 17 is plugged into. However, They may be designed such that a single-core plug is plugged into. The pairs of the housings 13 and 13', and 52 and 52' may be of different shapes, respectively.

In the above embodiments, an adapter is shielded. However, the shield may be made to a connector, where the plug 17 is fixed to an adapter inside the panel 12 and plugged into or unplugged from a connector section provided outside the panel 12.

According to the invention, since the adapter is connected to the ground of the panel through the installation section (the flange portion), the leakage and entrance of electromagnetic waves from the through-hole portion of the panel are firmly prevented. In addition, since only the insertion holes for the split sleeves are provided in the partition plate, the opening area in the partition plate is minimized and the amount of the leakage and entrance of electromagnetic waves through the partition plate is reduced.

Moreover, since the plug itself does not require the shield, a standard plug can be used, and the manufacturing cost is reduced.

What is claimed is:

1. An optical connector adaptor for connecting at least two optical connectors, comprising:

at least one shield case to be attached to a panel through a through-hole of said panel; and at least one pair of housings provided in said shield case, one for each side of said panel, each housing receiving one of said optical connectors and having at least one sleeve support for aligning and holding end portions of said optical connectors, said shield case being made of a conductive material so as to provide a partition plate between said pair of housings and a flange portion grounded to said panel, said partition plate and flange portion being provided such that leakage and entrance of electromagnetic waves from said through-hole of said panel are minimized, wherein said each housing is made of a synthetic resin so as to have a plugging section into which one of said optical connectors is insertable, either said each housing or said shield case has at least one engaging boss and the other has at least one engaging hole so that said housing is secured to said shield case by engagement between said engaging boss and hole, and said each housing has two sets of pairs of optical connector locking members extending inwardly, from opposite side walls of said housing in a plugging direction of said optical connector.

2. The optical connector adaptor according to claim 1, wherein said flange portion is provided along said through-hole of said panel so as to cover a gap produced along a periphery of said through-hole.

3. The optical connector adaptor according to claim 1, wherein said shield case is inclined with respect to said panel, said flange portion is inclined at a predetermined angle with respect to said partition plate, and connecting portions between said flange portion and said partition plate are made of a conductive material so that said leakage and entrance of electromagnetic waves from said through-hole of said panel are minimized.

4. The optical connector adaptor according to claim 3, wherein a plurality of said housings are connected to each other in a stepped-shape and connecting portions for connecting said partition plates of said housings are made of a conductive material.

5. The optical connector adaptor according to one of claims 1–2, wherein said shield case is fixed to said panel with said flange portion.

6. The optical connector adaptor according to one of claims 1–2, wherein each of said pair of housings has an identical shape.

7. The optical connector adaptor according to one of claims 1–4, wherein each of said pair of housings has at least one engaging member with at least one engaging boss, and at least one engaging hole for engaging with said engaging boss, and said partition plate has at least one slot so that when said engaging member is inserted through said slot, said pair of housings are held in said shield case by an engagement between said engaging boss of one of said pair of housing and said engaging hole of the other said pair of housings.

* * * * *